June 12, 1962     E. T. ANGUS ET AL     3,039,040
DIRECT CURRENT TACHOMETER GENERATORS
Filed Oct. 10, 1960
2 Sheets-Sheet 1
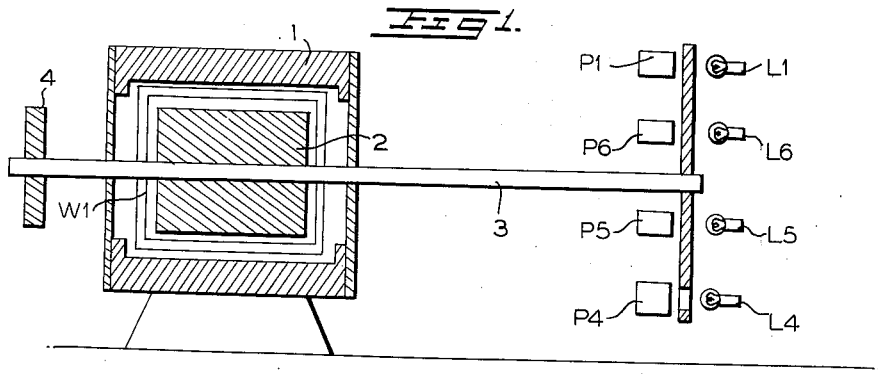
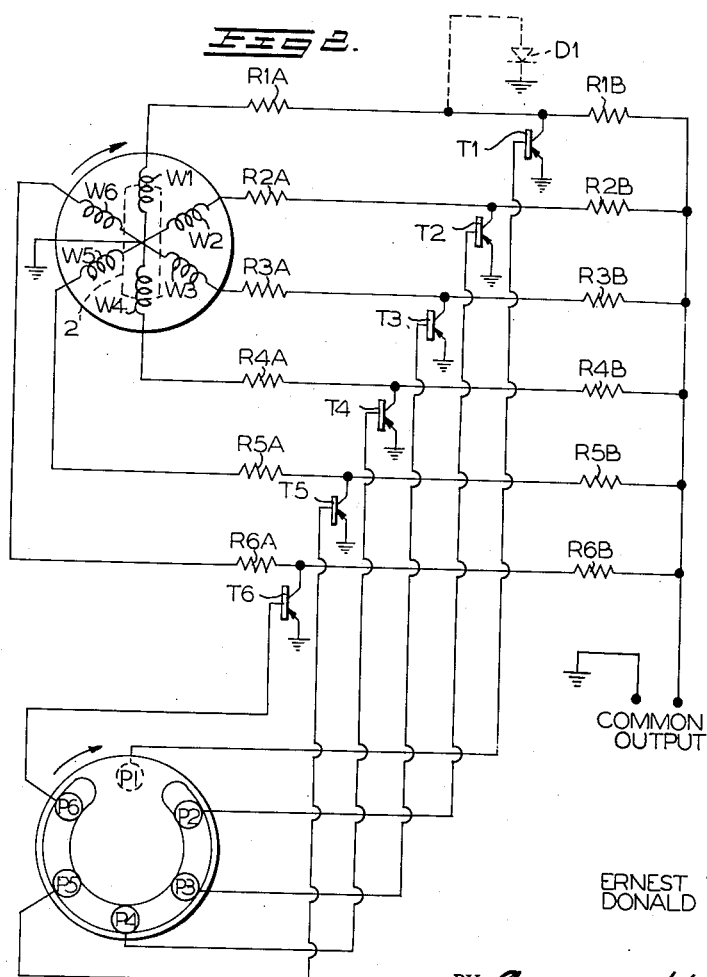
INVENTORS
ERNEST T. ANGUS
DONALD F. WALKER
BY *Cameron, Kerkam & Sutton*
ATTORNEYS

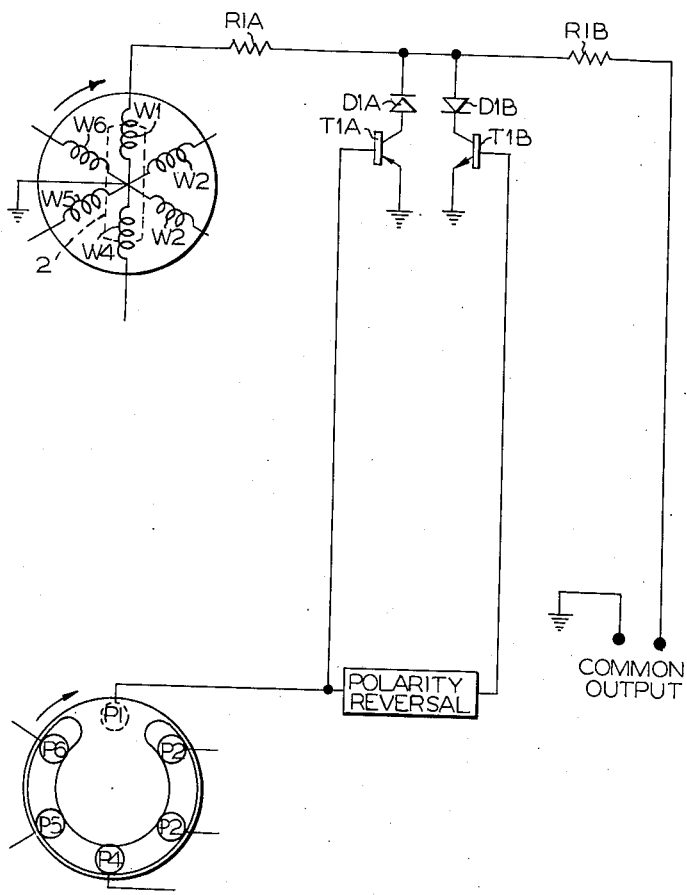

United States Patent Office 3,039,040
Patented June 12, 1962

3,039,040
DIRECT CURRENT TACHOMETER GENERATORS
Ernest Thomas Angus, Edinburgh, and Donald Ferguson Walker, Barnton, Midlothian, Scotland, assignors to Ferranti, Limited, Hollinwood, England, a company of the United Kingdom of Great Britain and Northern Ireland
Filed Oct. 10, 1960, Ser. No. 61,620
Claims priority, application Great Britain Oct. 9, 1959
6 Claims. (Cl. 322—94)

This invention relates to direct current tachometer generators.

A direct current tachometer generator usually includes a commutator which suffers from the disadvantage that variations in the generator output may be caused due to varying contact resistance between the brushes and the commutator and for this reason direct current tachometer generators are not widely used.

It is, therefore, an object of the present invention to provide a direct current tachometer generator in which the above disadvantage is obviated.

According to the present invention a direct current tachometer generator comprises a permanently magnetised rotor driven by an input shaft, a wound stator having a plurality of windings, each winding being connected to a common output terminal, an individual electronic switching circuit associated with each of said windings and controlled by the output current from an individual energy transducer to permit or prevent the output on the associated winding from being applied to said output terminal, and a disc rotated in synchronism with said rotor by said input shaft, said disc controlling a supply of energy to said energy transducers which are disposed in relation to said disc in such manner that the output from any one winding is applied to said output terminal only during that time in which it is of one polarity and is greater than the output of the same polarity from any other winding.

The expression "energy transducer" as used herein means a device for converting energy of one kind, e.g. light energy, into electrical energy. Thus in one embodiment of the invention said energy transducers may be photo-electric cells in which case said disc may be provided with a slot which controls the light falling on each cell from an associated light source.

The invention will now be described by way of example with reference to the accompanying drawings in which:

FIGURE 1 is a schematic sectional elevation of one form of direct current tachometer generator in accordance with the invention, FIGURE 2 is a circuit diagram of the connections of the tachometer generator shown in FIGURE 1, and FIGURE 3 is a circuit diagram of a modified form of the circuit shown in FIGURE 2.

Referring now to the drawings, the direct current tachometer generator shown includes a wound stator 1 having six windings W1 . . . W6, of which only the winding W1 is visible in FIGURE 1, and a permanently magnetised rotor 2 rigidly secured to an input shaft 3 which is driven by a driving wheel 4. Also rigidly secured to the input shaft 3 is a disc 5 having an arcuate slot 6 subtending an angle of 300° at the centre of the disc 5. Six photo-electric cells P1 . . . P6 are mounted to one side of the disc 5 and six light sources L1 . . . L6 are mounted to the other side of the disc 5, only the light sources L1, L4, L5 and L6 being shown in the drawings. The windings W1 . . . W6 are connected to a common output via resistors R1A and R1B . . . R6A and R6B respectively, the junctions between the resistors R1A and R1B . . . R6A and R6B being connected to the collector electrodes of six transistors T1 . . . T6 respectively. The emitter electrodes of the six transistors T1 . . . T6 are all connected to earth potential and the base electrodes are connected via amplifiers (not shown) to the photo-electric cells P1 . . . P6 respectively.

In operation the slot 6 in the disc 5 permits light to fall on five of the six photo-electric cells P1 . . . P6. In FIGURE 2 the photo-electric cells P2 . . . P6 are shown illuminated and the outputs from these are applied to the base electrodes of the transistors T2 . . . T6 respectively biasing these to a conductive condition thus clamping the junctions between resistors R2A and R2B . . . R6A and R6B at earth potential and preventing any output from the windings W2 . . . W6 reaching the common output. The photo-electric cell P1, however, is not illuminated and the transistor T1 is therefore not biased to a conductive condition so that the negative output induced on the winding W1 by rotation of the rotor 2 is connected to the common output. When the rotor 2 has rotated through 30° from the position shown in FIGURE 2 the photo-electric cell P1 becomes illuminated and the photo-electric cell P2 becomes obscured. The transistor T1 therefore becomes conductive and clamps the junction between the resistors R1A and R1B to earth potential, and the transistor T2 becomes non-conductive thus connecting the output induced on the winding W2 to the common output.

The photo-electric cell P2 is obscured during 60 degrees of the rotation of the rotor 2 during which period the output induced on the winding W2 is greater than the output induced on any other winding. Each of the other photo-electric cells are similarly obscured for 60 degrees of the rotation of the rotor 2, there being a resultant direct current output from the common output.

When the rotor 2 has rotated through 180° from the position shown in FIGURE 2 a positive output will be induced on the winding W1. The transistor T1 will be cut-off due to illumination of the photo-electric cell P1, but in order to prevent the application of this positive output to the collector of the transistor T1 a diode D1 may be connected between earth and the collector of the transistor T1 as shown in broken line in FIGURE 2. The diode D1 thus shorts out any positive output from the winding W1 and prevents any posibility of such an output from reaching the common output terminals. A further five diodes are similarly connected to the collectors of the transistors T2 . . . T6, but have not been shown in the drawing for the sake of clarity.

If the rotor 2 is rotated in the opposite direction the voltage peaks induced on a winding during the period when its associated photo-electric cell is obscured will be of opposite sign. Therefore, if an output is required when the rotor 2 is rotating in the opposite direction it is necessary to provide a further six transistors to operate with the voltages of opposite sign, and such an arrangement is shown in FIGURE 3, in which like parts have been given like reference numerals.

In FIGURE 3 only the connections for the winding W1 have been shown, but it will be appreciated that the windings W2 . . . W6 are similarly connected. The winding W1 is connected to the common output via resistors R1A and R1B, as previously, and the collector of a pnp transistor T1A is now connected to the junction between the resistors R1A and R1B via a diode D1A which is arranged to prevent any positive output on the winding W1 from being applied to the collector of the transistor T1A. The base of the transistor T1A is connected to the photo-electric cell P1 and the emitter to earth potential, as previously. An npn transistor T1B, is also connected to the junction of the resistor R1A and R1B via a diode D1B which is arranged to prevent any negative output on the winding W1 from being applied to the collector of the transistor T1B. The emitter of the transistor T1B is connected to earth potential and the base thereof is connected to the photo-electric cell P1 via a polarity reversal means 7 such as a unity gain amplifier.

In operation, when the rotor 2 is rotating in the direction of the arrow and is in the position shown, a maximum negative voltage output is induced on the winding W1. The photo-electric cell P1 is not illuminated and therefore both of the transistors T1A and T1B are biased to cut-off and the negative output is applied to the common output terminals. The remaining photo-electric cells P2 . . . P6 are illuminated and any negative outputs on the windings W2 . . . W6 are shorted to earth through the respective diodes D2A . . . D6A and transistors T2A . . . T6A.

When the rotor 2 has rotated through 180° from the position shown in FIGURE 3 a positive output is induced on the winding W1. The photo-electric cell P1, however, is now illuminated and the transistors T1A and T1B are biased to a conductive condition. The diode D1A prevents this output from being applied to the collector of the transistor T1A, but the diode D1B conducts and the positive output is therefore shorted to earth through the transistor T1B and does not affect the common output.

Upon rotation of the rotor 2 in the opposite direction a maximum positive voltage output is induced on the winding W1 when the rotor is in the position shown. As before, the photo-electric cell P1 is not illuminated and the positive output is applied to the common output terminals. Any positive output on the windings W2 . . . W6 is shorted to earth potential through the respective diodes D2B . . . D6B and transistors T2B . . . T6B. Similarly, the negative output induced on the winding W1 when the rotor 2 has rotated through 180° is shorted to earth potential through the diode D1A and the transistor T1A.

The tachometer generator described above may be varied in many ways. For example, the stator may have more or less than the six windings described and the rotor may have more than two poles. Furthermore, the photo-electric cells and their associated light sources may be replaced by other forms of energy transducer such as inductive pick-off coils in which case the disc may be of such a material and suitably shaped so that on rotation of the disc the magnetic reluctance of the pick off coils is varied thereby producing signals for controlling the switching circuits associated with the stator windings.

What we claim is:

1. A direct current tachometer generator comprising a permanently magnetised rotor driven by an input shaft, a wound stator having a plurality of windings, each winding being connected to a common output terminal, an individual eletronic switching circuit associated with each of said windings and controlled by the output current from an individual energy transducer to permit or prevent the output on the associated winding from being applied to said output terminal, and a disc rotated in synchronism with said rotor by said input shaft, said disc controlling a supply of energy to said energy transducers which are disposed in relation to said disc in such manner that the output from any one winding is applied to said output terminal only during that time in which it is of one polarity and is greater than the output of the same polarity from any other winding.

2. A direct current tachometer generator as claimed in claim 1 in which said energy transducers are photoelectric cells and in which said disc is provided with a slot which controls the light falling on each cell from an associated light source.

3. A direct current tachometer generator as claimed in claim 1 in which each of said switching circuits includes a transistor which is controlled to be in a conductive or a non-conductive condition by the output current from the associated energy transducer.

4. A direct current tachometer generator as claimed in claim 3 in which the collector of said transistor is connected to a point between the associated winding and said output terminal and the emitter of said transistor is connected to earth, the output of the associated energy transducer being applied to the base of said transistor.

5. A direct current tachometer generator as claimed in claim 4 in which a diode is connected between the collector of said transistor and earth, said diode being poled to conduct when the output on the winding associated with said transistor is of opposite polarity to that which is applied to said output terminal.

6. A direct current tachometer generator as claimed in claim 1 in which each of said switching circuits includes a pnp transistor having its emitter connected to earth potential, a first diode connected between the collector of said pnp transistor and a point between the associated winding and said output terminal, said first diode being poled to pass only voltages of positive polarity to the collector of said pnp transistor, an npn transistor having its emitter connected to earth potential, and a second diode connected between the collector of said npn transistor and said point, said second diode being poled to pass only voltages of negative polarity to the collector of said npn transistor, control signals for applying to the bases of said pnp and npn transistors being derived from the associated energy transducers.

No references cited.